USOO9744095B1

(12) United States Patent
Mazzei et al.

(10) Patent No.: US 9,744,095 B1
(45) Date of Patent: Aug. 29, 2017

(54) SELF-PROPELLED WALKER

(71) Applicants: Angelo L. Mazzei, Bakersfield, CA (US); Javier Bustamante, Bakersfield, CA (US)

(72) Inventors: Angelo L. Mazzei, Bakersfield, CA (US); Javier Bustamante, Bakersfield, CA (US)

( * ) Notice: Subject to any disclaimer, the term of this patent is extended or adjusted under 35 U.S.C. 154(b) by 0 days.

(21) Appl. No.: 15/431,294

(22) Filed: Feb. 13, 2017

(51) Int. Cl.
| *A61H 3/04* | (2006.01) |
| *B62D 51/02* | (2006.01) |
| *B60K 1/02* | (2006.01) |
| *B62K 11/00* | (2006.01) |
| *A61G 5/04* | (2013.01) |
| *A61G 5/12* | (2006.01) |

(52) U.S. Cl.
CPC ............... *A61H 3/04* (2013.01); *A61G 5/04* (2013.01); *A61G 5/128* (2016.11); *B60K 1/02* (2013.01); *B62D 51/02* (2013.01); *B62K 11/007* (2016.11); *A61H 2003/043* (2013.01); *A61H 2003/046* (2013.01); *A61H 2201/0192* (2013.01); *A61H 2201/1633* (2013.01); *A61H 2201/5064* (2013.01)

(58) Field of Classification Search
CPC .... A61H 3/04; A61H 2003/43; B62K 11/007; B60K 1/02; B62D 51/02
USPC ........................................................ 180/65.1
See application file for complete search history.

(56) References Cited

U.S. PATENT DOCUMENTS

| 2,448,992 A * | 9/1948 | Love ...................... A61G 5/047 180/13 |
| 6,360,836 B1 * | 3/2002 | Milano, Jr. ............. B62B 5/005 180/65.6 |
| 6,378,883 B1 * | 4/2002 | Epstein .................... A61G 5/04 180/6.5 |
| 6,435,535 B1 * | 8/2002 | Field .................... B62D 51/008 180/218 |
| 6,860,347 B2 * | 3/2005 | Sinclair .................. A61G 5/047 180/11 |
| D601,922 S | 10/2009 | Imai et al. |
| 7,694,991 B2 * | 4/2010 | Mills ........................ A61G 5/10 180/11 |
| 7,699,128 B1 * | 4/2010 | Strauss ................... B62B 5/002 180/23 |
| 8,225,891 B2 | 7/2012 | Takenaka et al. |
| 8,738,278 B2 | 5/2014 | Chen |
| 9,272,589 B2 * | 3/2016 | Yamano ................... B60D 1/00 |
| 9,403,573 B1 | 8/2016 | Mazzei et al. |

(Continued)

FOREIGN PATENT DOCUMENTS

CN 104029769 9/2014

*Primary Examiner* — Tony Winner
(74) *Attorney, Agent, or Firm* — James M. Duncan, Esq.; Klein DeNatale Goldner

(57) ABSTRACT

An improved walker has a detachable propulsion unit, which is attached to the walker by a platform member which extends forwardly from the propulsion unit, with an upwardly extending walker structure partially attached to the platform member. The user steps onto the propulsion unit while support on either side by the handles of the walker. The platform member is so attached to the propulsion unit as to allow a left section and a right section of the propulsion unit to be independently movable with respect to one another, thereby allowing operation of the propulsion unit. The propulsion unit may be a hover board or power board.

20 Claims, 6 Drawing Sheets

(56) References Cited

U.S. PATENT DOCUMENTS

| | | |
|---|---|---|
| 2004/0129464 A1* | 7/2004 | Arling .................. B62D 51/008 180/7.1 |
| 2006/0202439 A1 | 9/2006 | Kahlert et al. |
| 2007/0131461 A1* | 6/2007 | Treadwell ............... B62B 5/005 180/19.1 |
| 2008/0029985 A1 | 2/2008 | Chen |
| 2008/0147281 A1 | 6/2008 | Ishii |
| 2009/0032323 A1 | 2/2009 | Kakinuma et al. |
| 2009/0078485 A1 | 3/2009 | Gutsch et al. |
| 2009/0105908 A1 | 4/2009 | Casey et al. |
| 2010/0025139 A1 | 2/2010 | Kosaka et al. |
| 2010/0121538 A1 | 5/2010 | Ishii et al. |
| 2010/0193264 A1* | 8/2010 | Kurek ..................... A61H 3/04 180/19.1 |
| 2010/0222994 A1 | 9/2010 | Field et al. |
| 2010/0237645 A1 | 9/2010 | Trainer |
| 2011/0220427 A1 | 9/2011 | Chen |

* cited by examiner

SELF-PROPELLED WALKER

BACKGROUND OF THE INVENTION

The present invention relates to walkers utilized by persons requiring additional support as they walk. The present invention also relates to self-propelled vehicles in which the operator is standing upon the vehicle and the vehicle is controlled by a user's feet. The present invention more particularly relates to providing a self-propelled walker which utilizes a propulsion unit controlled by a user's feet.

U.S. Pat. No. 8,738,278 (the "'278 patent") teaches a two-wheeled, self-balancing vehicle having two platform sections which are independently moveable with respect to one another and which provides independent control and/or drive of the wheel associated with a given platform section. The disclosed vehicle is operated by a user leaning forward to go forward, leaning backward to reverse, pointing left toes downward to turn right and to point right toes downward to turn left. A variety of these devices are available to the consumer under a number of different generic names, such as power board, hover board, self-balancing scooter, gyro board, etc. These types of devices, among others, may be utilized as a propulsion unit for propelling the invention forward, backward, and turning left or right.

The inventors herein are inventors of in U.S. Pat. No. 9,403,573, which discloses a hover board tricycle, which may be formed by attaching a platform member to a hover board and attaching a wheel or roller to the underside of the platform member and a handle member to the top side of the platform member.

Hover boards and related devices are typically utilized by individuals who have no difficulty standing and have relatively good balance. However, such devices are not typically considered for use by persons having difficulty standing or walking because of age, injury, or other conditions impacting a person's balance or endurance. Such persons may utilize any number of support devices, including walkers, which assist the person in standing and walking. While walkers provide stability to a user, the devices nevertheless require the user to propel himself or herself by walking. While certain known devices propel a person in a standing position, these devices are generally directed toward persons who do not require the additional stability provided by the structure of a walker. Morever, the known devices are relatively expensive.

SUMMARY OF THE INVENTION

Embodiments of the present invention provide a self-propelled walker which utilizes a propulsion unit to propel a person, thereby allowing a person additional mobility and utility, but also allowing that person to have the stability and safety of a walker.

Embodiments of the present invention may have a propulsion unit having a first foot placement section and a second foot placement section. The first foot placement section and the second foot placement section are coupled to one another and are independently movable with respect to one another. A first wheel is associated with the first foot placement section and a second wheel is associated with the second foot placement section. The first and second wheels are spaced apart and substantially parallel to one another. The propulsion unit may also have a first position sensor and a first drive motor configured to drive the first wheel. Similarly, the propulsion unit has a second position sensor and a second drive motor configured to drive the second wheel. Because hover boards and power boards provide a satisfactory propulsion unit, the present invention may be assembled by integrating one of these devices with the other structural components resulting in a relatively inexpensive self-propelled walker. Embodiments of the invention include a self-propelled walker, an improved walker, and an improved propulsion unit.

In addition to the propulsion unit, embodiments of the invention have a platform member which has a first end which attaches to the approximate middle of the propulsion unit and a second end which cantilevers forward from the propulsion unit. The second end of the platform member has a bottom side from which depends a ground engaging wheel or roller. The second end of the platform member has a top side from which, in some embodiments, a handle member may extend. The handle member extends upwardly a sufficient length to be grasped by a person standing upon the propulsion unit.

The platform member may be coupled to the propulsion unit by a front u-block which is attached to a rear u-block, the front u-block and the rear u-block attached in opposite-facing relation, wherein an opening is defined between the attached u-blocks and a portion of the propulsion unit is disposed within the opening and sandwiched between the u-blocks.

Alternatively, the platform member may be coupled to the propulsion unit by a pair of u-bolts, wherein each u-bolt comprises a pair of threaded arms protruding from a curved base and the threaded arms extend into a downwardly facing vertical plate and the curved base of each u-bolt is disposed about a portion of the propulsion unit.

DETAILED DESCRIPTION OF THE INVENTION

Figure 1:
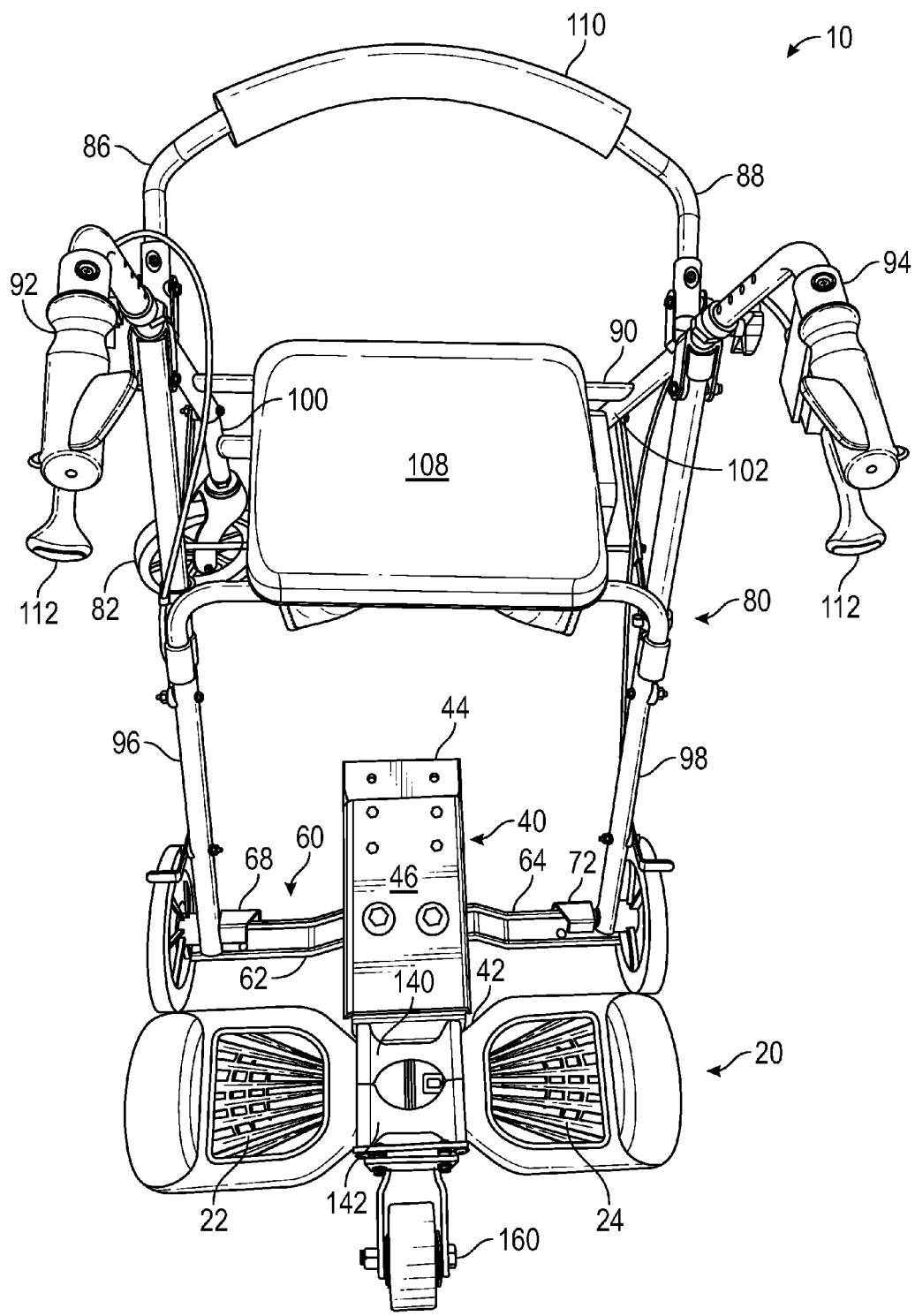
FIG. 1 shows a rear perspective view of an embodiment of the present invention.
Figure 2:
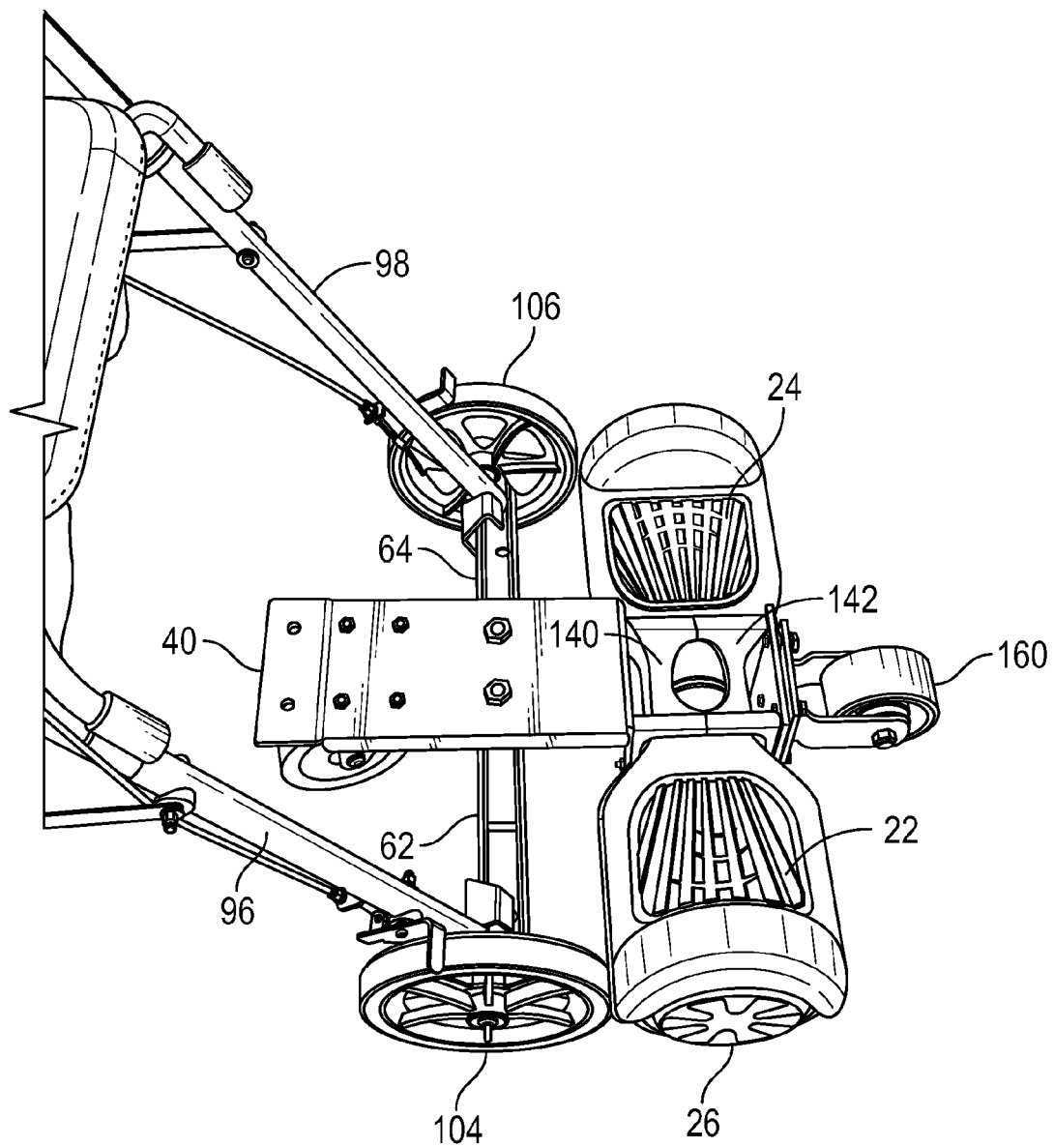
FIG. 2 shows a partial side perspective view of the embodiment of the present invention shown in FIG. 1.
Figure 3:
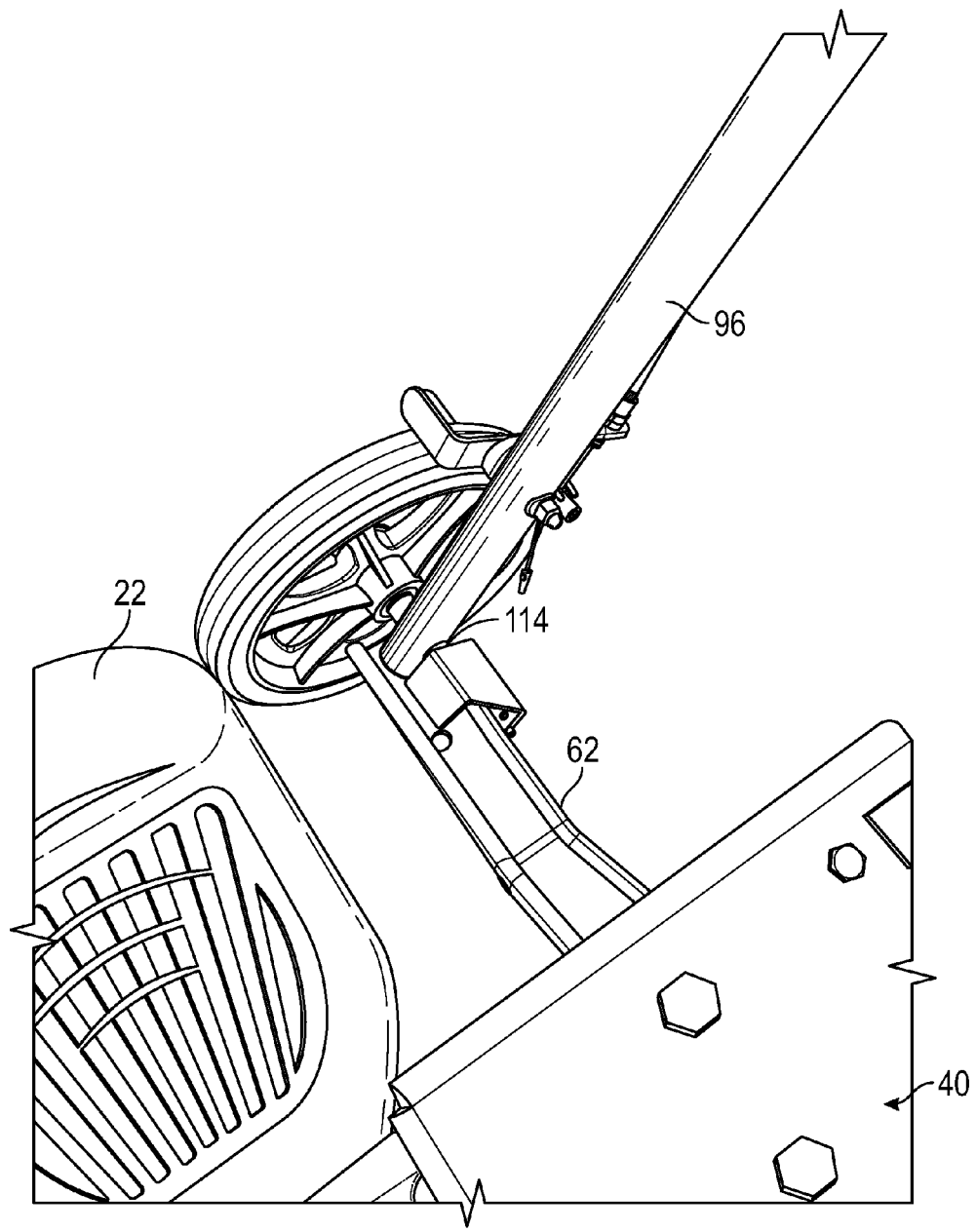
FIG. 3 shows a close up view of the engagement of a rear post of a walker with the walker support member in an embodiment of the present invention.

Referring now to the figures, embodiments of the self-propelled walker 10 comprise a propulsion unit 20, a platform member 40, a walker support member 60, and a walker 80. The terms "left", "right", "front", "back", "forward", "upward" and "downward" are used with respect to a user standing facing forward on an embodiment of the self-propelled walker as shown in FIG. 1.

The term "propulsion unit" as used herein includes, among other things, a two-wheeled, self-balancing vehicle having a left foot section 22 and a right foot section 24 which are coupled together but independently moveable with respect to one another. Left foot section 22 and right foot section 24 each provide independent control and/or drive of the wheel associated with a given section, such that left foot section 22 provides control to left wheel 26 and right foot section 24 provides control to right wheel 28. The disclosed self-propelled walker 10 is operated by a user leaning forward to go forward, leaning backward to reverse, pointing left toes downward to turn right and to point right toes downward to turn left. Such a propulsion unit is taught in the '278 patent by Chen, entitled "Two-wheel, self-balancing vehicle with independently movable foot placement sections."

Figure 4:
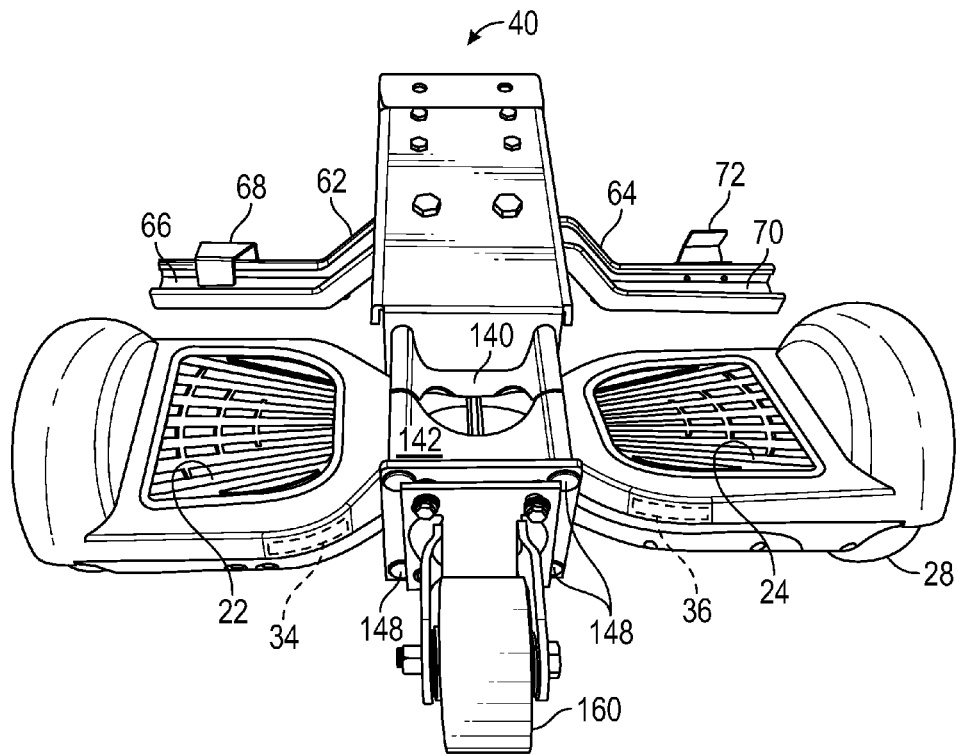
FIG. 4 shows a rear view of a propulsion unit, a platform member and a walker support member in an embodiment of the present invention.

Left wheel 26 and right wheel 28 are spaced apart and substantially parallel to one another. The propulsion unit 20 further comprises a left side drive motor 30 configured to drive the left wheel 26 and a right side drive motor 32 configured to drive the right side drive wheel 28. As schematically shown in FIG. 4, a left side position sensor 34, such as a gyroscopic sensor, is mounted on a circuit board and provides measurement of the orientation of left foot section 22. Likewise, right side position sensor 36 is mounted on a circuit board and provides measurement of the orientation of the right side foot section 24.

Platform member 40 generally comprises a plate extending forward from the propulsion unit 20. Platform member 40 has a first end 42 and a second end 44. Platform member 40, which may be manufactured from a rectangular piece of steel plate, has a top 46 and a bottom 48. Platform member 40 cantilevers horizontally forward from propulsion unit 20, where first end 42 is coupled to the propulsion unit 20. At the second end 44 of platform member 40, ground engaging wheel 50 depends from bottom 48 and engages the ground. The ground engaging wheel 50 will typically be of the plate-mounted caster type as shown in the figures, with a rubber wheel, although other wheel substances such as polyurethane, pneumatic, or polyolefin wheels may also be used. Ground engaging wheel 50 may also be a roller. The wheel 50 will typically be of the swivel self-turning type.

Walker support member 60 is attached to the platform member 40. Walker support member 60 has a left support member 62 outwardly extending from the left side of the platform member 40 and a right support member 64 outwardly extending from the right side of the platform member 40.

Figure 5:
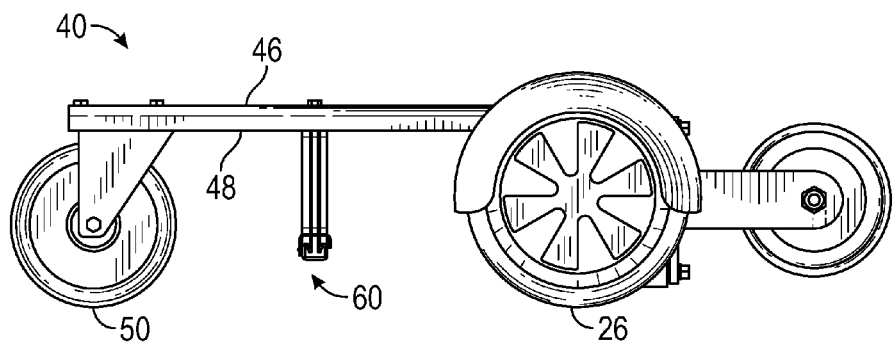
FIG. 5 shows a left side view of the propulsion unit, the platform member and the walker support member depicted in FIG. 4.
Figure 6:
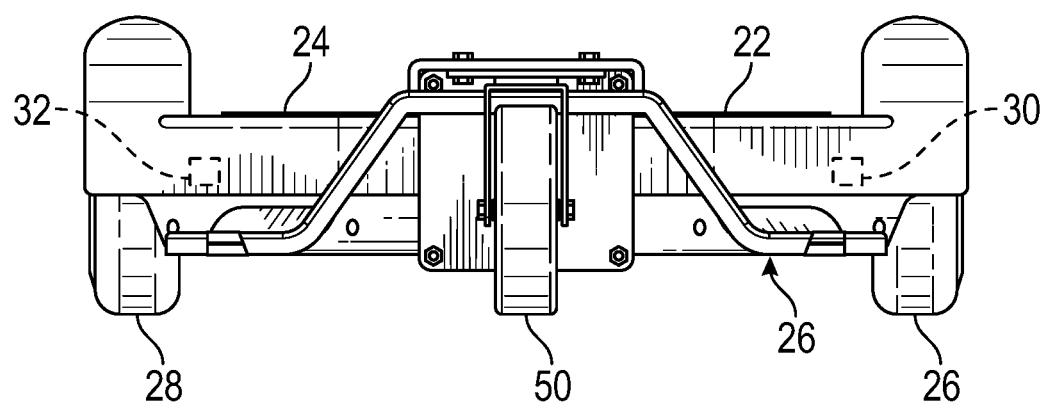
FIG. 6 shows a front view of the propulsion unit, the platform member and the walker support member depicted in FIG. 4.

An embodiment of the combination of the propulsion unit 20, the platform member 40, and the walker support member 60 is depicted in FIGS. 4-6. This combination may be coupled to an upwardly extending walker structure 80. The upwardly extending walker structure ("walker") 80 may have two front wheels 82, 84 which engage the ground. This configuration provides a stable self-provided vehicle having five ground engaging wheels, namely propulsion unit wheels 26. 28, ground engaging wheel 50 depending from platform member 40, and walker front wheels 82, 84.

Walker 80 may comprise walker front wheels 82, 84, a left side 86, a right side 88, a transverse member 90 attaching the left side 86 to the right side 88, a left hand support 92, a right hand support 94, a left side rear post 96, a right side rear post 98, a left side front post 100 to which left front wheel 82 is attached, and a right side front post 102 to which right front wheel 84 is attached. An opening is defined between the left side 86 and the right side 88, wherein a user may place stand with a foot on the left foot section and a foot on the right foot section and hold onto the left hand support and the right hand support.

It is to be appreciated that the present invention may comprise a very basic walker having some or all of the components just described. However, the walker 80 may have many other features which are known to be used with walkers. For example, the left side rear post 96 may comprise a left rear wheel 104 and right side rear post 98 may comprise a right rear wheel 106. The walker 80 may also have a seat member 108, a front support 110, brake levers 112, and other optional features.

It is to be appreciated that in the operation of the present invention, if the walker 80 has left rear wheel 104 and right rear wheel 106, those wheels will not necessarily engage the ground when the walker 80 is coupled to the walker support member 60. The walker support member 60 provides a universal attachment fixture for a variety of different embodiments of walker 80. The walker support member 60 may have a variety of locking mechanisms which secure the walker 80 to the walker support structure. For example the walker support structure may have a pivoting latch which secures the walker to the walker support member, such as the mechanisms described below.

In attaching walker 80 to the walker support member 60, the left side rear post 96 is received by a left side engagement structure 66, such as the channel configuration of left support member 62. Left support member 62 may further comprise a left side lock member 68 which secures the left side rear post 60 to the walker support member 60. Left side lock member 68 may pivot with respect to left support member 62, so that the left side lock member may pivot over and engage a member of the left side rear post 96 which extends toward the left side lock member 68. For example, if a left rear wheel 104 is attached to left side rear post 96, an axle member or axle nut will typically extend toward left side lock member 68. Left side lock member 68 may then pivot over the axle member 114 or axle nut and secure the walker 80 to the walker support member 60. This locking mechanism allows the walker to easily be attached and removed from the propulsion unit 20.

Likewise, in attaching walker 80 to the walker support member 60, the right side rear post 98 is received by a right side engagement structure 70, such as the channel configuration of right support member 64. Right support member 64 may further comprise a right side lock member 72 which secures the right rear post 98 to the walker support member 60. Right side lock member 72 may pivot with respect to right support member 64, so that the right side lock member 72 may pivot over and engage a member of the right side rear post 98 which extends toward the right side lock member 72. For example, if a right rear wheel 106 is attached to right side rear post 98, an axle member or axle nut will typically extend toward right side lock member 72. Right side lock member 72 may then pivot over the axle member or axle nut and further secure the walker 80 to the walker support member 60.

Figure 7:
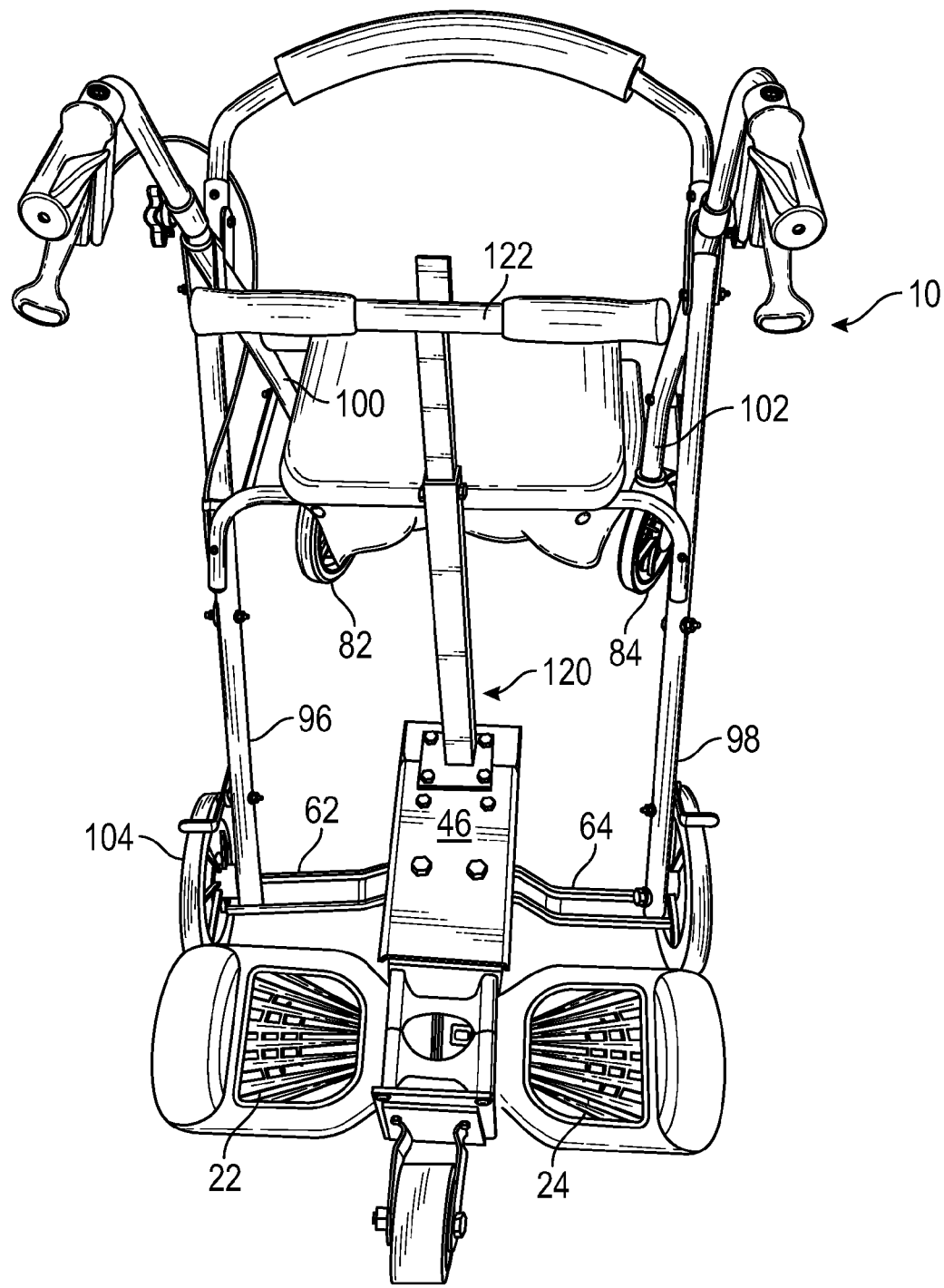
FIG. 7 shows a rear perspective view of an alternative embodiment of the present invention.

Embodiments of the self-propelled walker 10' may further comprise a handle member 120 which extends upwardly from the top 46 of the platform member 40. The handle member 120 is of a sufficient length to be grasped by a person standing upon the self-propelled walker 10', which means the handle member 120 will typically have a length of at least thirty inches, or the handle member 120 may be of a telescoping type, as shown in FIG. 7, which adjusts to the height of the user, whether child or adult. As shown in FIG. 7, handle member 120 may have a tee grip 122.

Platform member 40 may be coupled to propulsion unit 20 in a variety of manners so long as the platform member is sufficiently attached to prevent significant pivoting of the platform member about the propulsion unit 20. However, it is to be appreciated that the coupling of platform member 40 to propulsion unit 20 must allow left foot section 22 to be independently movable with respect to right foot section 24. Typically, adapter brackets and fasteners will be utilized. Because of the different dimensions of the various devices utilized as propulsion units 20, it is desirable to have a coupling mechanism which is universal, such as that shown for the embodiments shown in the figures, which allows sufficient independent movement of the left foot section 22 and the right foot section 24.

For the embodiments of the disclosed self-propelled walker 10, 10' depicted herein, the platform member 40 is coupled to the propulsion unit 20 by a front u-block 140 which is attached to a rear u-block 142. The front u-block 140 and the rear u-block 142 are attached in opposite-facing relation. An opening is defined between the points of attachment of front u-block 140 and rear u-block 142 where fasteners 148 are utilized to attach the front u-block and the rear u-block together. A portion of the propulsion unit 20 is disposed within the opening with the portion sandwiched between the u-blocks 140, 142 when the u-blocks are attached together with fasteners 148.

Embodiments of the self-propelled walker 10, 10' may have an optional rear wheel 160 which attaches to a backward facing side of rear u-block 142. The optional rear wheel 160 provides additional stability and support which assists the operator from falling over backwards. In normal operation of the self-propelled walker 10, 10', rear wheel 160 does not engage the ground.

The ability to attach a conventional walker 80 to a propulsion unit 20 provides both an improved walker and an improved propulsion unit. For example, a walker of generic design may be removably attached to a known hover board, when the hoverboard has been modified by utilization of the platform member 40 and walker support member 60 disclosed herein. The conventional walker 80 may be attached with relative ease and then removed when desired.

While the above is a description of various embodiments of the present invention, further modifications may be employed without departing from the spirit and scope of the present invention. Thus the scope of the invention should not be limited according to these factors, but according to the following appended claims.

What is claimed is:

1. A self-propelled walker comprising:
   a propulsion unit comprising a left foot section and a right foot section that are coupled to one another and are independently movable with respect to one another; a first wheel associated with the left foot section and a second wheel associated with the right foot section, the first and second wheels being spaced apart and substantially parallel to one another; a first position sensor and a first drive motor configured to drive the first wheel, a second position sensor and a second drive motor configured to drive the second wheel;
   a platform member having a first end and a second end and a right side and a left side, and a ground engaging wheel extending downwardly from the platform member, wherein the first end is coupled to the propulsion unit and the second end cantilevers horizontally forward from the propulsion unit, wherein a coupling of the platformmember to the propulsion unit allows the left foot section and the right foot section to be independently movable with respect to one another;
   a walker comprising a left side and a right side and a first transverse member attaching the left side to the right side, wherein the left side comprises a left side hand support, a left side rear post, a left side front post having a left side front wheel, and a right side having a right hand support, a right side rear post, and a right side front post having a right side front wheel; and
   a walker support member attached to the platform member, the walker support member having a left support member outwardly extending from the left side of the platform member and a right support member outwardly extending from the right side of the platform member, the left support member comprising a left side engagement structure for receiving and attaching to the left side rear post and the right support member comprising a right side engagement structure for receiving and attaching to the right side rear post.

2. The self-propelled walker of claim 1 wherein the platform member is coupled to the propulsion unit by a front u-block which is attached to a rear u-block, the front u-block and the rear u-block attached in an opposite-facing relation, wherein an opening is defined between the attached u-blocks and a portion of the propulsion unit is disposed within the opening and sandwiched between the u-blocks.

3. The self-propelled walker of claim 1 wherein the walker support member comprises a pivoting latch to secure the walker to the walker support member.

4. The self-propelled walker of claim 3 wherein the pivoting latch attaches to a wheel axle of the walker.

5. The self-propelled walker of claim 1 further comprising a handle member extending upwardly from the platform member.

6. The self-propelled walker of claim 5 wherein a height of the handle member is adjustable.

7. The self-propelled walker of claim 5 wherein the handle member comprises a tee-handle.

8. The self-propelled walker of claim 1 wherein the rear u-block comprises a backward face and a rear wheel extends from the backward face.

9. In a propulsion unit of the type having a left foot section and a right foot section that are coupled to one another and are independently movable with respect to one another, a first wheel associated with the left foot section and a second wheel associated with the right foot section, the first and second wheels being spaced apart and substantially parallel to one another, a first position sensor and a first drive motor configured to drive the first wheel, a second position sensor and a second drive motor configured to drive the second wheel, an improvement comprises:
   a platform member having a first end and a second end, a top and a bottom, and a ground engaging wheel depending from the bottom, wherein the first end is coupled to the left foot section and to the right foot section and the second end cantilevers horizontally forward from the first end, wherein a coupling of the platform member to the left foot section and to the right foot section allows the left foot section and the right foot section to be independently movable with respect to one another; and
   an upwardly extending walker structure attached to the platform member, the upwardly extending walker structure comprising a left side and a right side and a first transverse member attaching the left side to the right side, wherein the left side comprises a left hand support and the right side comprises a right hand support, wherein an opening is defined between the left side and the right side, wherein the propulsion unit is configured for a user to stand with a foot; on the left foot section and a foot on the right foot section and hold onto the left hand support and the right hand support.

10. The improvement of claim 9 wherein the platform member is coupled is to the left foot section and to the right foot section by a front u-block which is attached to a rear u-block, the front u-block and the rear u-block attached in an opposite-facing relation, wherein an opening is defined between the attached u-blocks, and a portion of the left foot section and a portion of the right foot section is disposed within the opening and sandwiched between the u-blocks.

11. The improvement of claim 9 wherein the platform member comprises a walker support member and the upwardly extending walker structure is attached to the walker support member.

12. The improvement of claim 11 wherein the walker support member comprises a left support member outwardly extending from the platform member and a right support member outwardly extending from the platform member.

13. The improvement of claim 12 wherein the upwardly extending walker structure comprises a left side rear post and a right side rear post.

14. The improvement of claim 13 wherein the left side rear post is received and retained by the left support member and the right side rear post is received and retained by the right support member.

15. The improvement of claim 9 wherein the upwardly extending walker structure comprises a left side front wheel and a right side front wheel.

16. In a walker of the type comprising a left side and a right side and a first transverse member attaching the left side to the right side, wherein the left side comprises a left side hand support, a left side rear post, a left side front post having a left side front wheel, and a right side having a right hand support, a right side rear post, and a right side front post having a right side front wheel, an improvement comprises:
 a propulsion unit of the type having a left foot section and a right foot section that are coupled to one another and are independently movable with respect to one another, a first wheel associated with the left foot section and a second wheel associated with the right foot section, the first and second wheels being spaced apart and substantially parallel to one another, a first position sensor and a first drive motor configured to drive the first wheel, a second position sensor and a second drive motor configured to drive the second wheel;
 a platform member having a first end coupled to the propulsion unit and a second end which extends horizontally from the propulsion unit, wherein a coupling of the platform member to the propulsion unit allows the left foot section and the right foot section to be independently movable with respect to one another;
 a ground engaging wheel extending downwardly from the platform member; and
 a walker support member attached to the platform member, the walker support member receiving and securing the left side rear post and the right side rear post of the walker.

17. The improvement of claim 16 wherein the platform member is coupled is to the left foot section and to the right foot section by a front u-block which is attached to a rear u-block, the front u-block and the rear u-block attached in opposite-facing relation, wherein an opening is defined between the attached u-blocks, and a portion of the left foot section and a portion of the right foot section is disposed within the opening and sandwiched between the u-blocks.

18. The improvement of claim 16 wherein the walker comprises a left side front wheel and a right side front wheel.

19. The improvement of claim 16 wherein the walker support member comprises a pivoting latch to secure the walker to the walker support member.

20. The improvement of claim 19 wherein the pivoting latch attaches to a wheel axle of the walker.

* * * * *